(12) United States Patent
Min et al.

(10) Patent No.: US 10,513,145 B2
(45) Date of Patent: Dec. 24, 2019

(54) OMNIDIRECTIONALLY MOVING WHEEL AND ROBOT USING SAME

(71) Applicant: LG ELECTRONICS INC., Seoul (KR)

(72) Inventors: Jiho Min, Seoul (KR); Keunyoung Park, Seoul (KR); Namjin Kim, Seoul (KR); Eulpyo Hong, Seoul (KR); Taebum Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 15/740,794

(22) PCT Filed: Jul. 8, 2015

(86) PCT No.: PCT/KR2015/007051
§ 371 (c)(1),
(2) Date: Dec. 28, 2017

(87) PCT Pub. No.: WO2017/003000
PCT Pub. Date: Jan. 5, 2017

(65) Prior Publication Data
US 2018/0194165 A1 Jul. 12, 2018

(30) Foreign Application Priority Data
Jun. 30, 2015 (KR) .......................... 10-2015-0093472

(51) Int. Cl.
*B60B 19/00* (2006.01)
*B25J 5/00* (2006.01)
(Continued)

(52) U.S. Cl.
CPC ............. *B60B 19/003* (2013.01); *B25J 5/007* (2013.01); *B60B 19/14* (2013.01); *B60B 33/0021* (2013.01); *B60B 2900/551* (2013.01)

(58) Field of Classification Search
CPC .............................. B60B 19/003; B60B 19/14
See application file for complete search history.

(56) References Cited

U.S. PATENT DOCUMENTS 9,004,202 B2 * 4/2015 Riwan ................... B60B 19/003
 180/7.1
2015/0129340 A1 5/2015 Maisonnier et al.

FOREIGN PATENT DOCUMENTS

JP 2015-515941 6/2015
JP 2016215713 A * 12/2016
(Continued)

OTHER PUBLICATIONS

International Search Report (with English Translation) and Written Opinion dated Mar. 8, 2016 issued in Application No. PCT/KR2015/007051.

*Primary Examiner* — Nicole T Verley
(74) *Attorney, Agent, or Firm* — KED & Associates, LLP

(57) ABSTRACT

The present invention relates to an omnidirectionally moving wheel and a robot using the same, and the omnidirectionally moving wheel comprises: a cylindrical body of which both ends are opened; inner wheels, each of which have at least a part accommodated in the body, and which are respectively fixed at the both open ends of the body so as to rotate around a first rotating axis; an outer wheel provided on the outside of the body and rotating around a second rotating axis, which intersects the first rotating axis, wherein the outermost points of the inner wheels and the outer wheel are formed at the same distance from the center of the body.

19 Claims, 14 Drawing Sheets

(51) Int. Cl.
*B60B 19/14* (2006.01)
*B60B 33/00* (2006.01)

(56) References Cited

FOREIGN PATENT DOCUMENTS

| KR | 100976171 B1 | * | 8/2010 |
| KR | 20160115454 A | * | 10/2016 |

\* cited by examiner

OMNIDIRECTIONALLY MOVING WHEEL AND ROBOT USING SAME

CROSS-REFERENCE TO RELATED PATENT APPLICATIONS

This application is a U.S. National Stage Application under 35 U.S.C. § 371 of PCT Application No. PCT/KR2015/007051, filed Jul. 8, 2015, which claims priority to Korean Patent Application No. 10-2015-0093472, filed on Jun. 30, 2015, whose entire disclosures are hereby incorporated by reference.

TECHNICAL FIELD

The present invention relates to an omnidirectionally moving wheel capable of freely moving in all directions and a robot using the same.

BACKGROUND ART

Recently, researches of robots that can do a lot of things for convenience of people are being actively carried out. These robots often go through complicated paths to reach desired positions.

In order to solve such a problem, an omnidirectional driving mechanism has been developed. The omnidirectional driving mechanism refers to improving motion ability of a robot or the like to enable movement in three degrees of freedom (forward/backward movement, leftward/rightward movement, and rotation) on a 2-dimensional (2D) plane (flat surface) such that the robot can travel in an arbitrary posture along an arbitrary direction.

There are various omnidirectional driving mechanisms. Among others, an off-centered wheel mechanism is a typical mechanism using the related art wheel. In order to perform an omnidirectional movement, a steering shaft is installed on each wheel at a predetermined distance from a center of the wheel, so as to steer the wheel to move in an omnidirectional manner.

Examples of wheels specially designed to omnidirectionally move includes an omnidirectional wheel, a universal wheel, a Mecanum wheel, a double wheel, an alternate wheel, a half wheel, an orthogonal wheel, a ball wheel, and the like.

Among others, the omnidirectional wheel is not easily moved at a place where a small step is formed. In addition, there are many contact points with the ground, thereby generating a lot of vibration while the wheel is driven.

In the omnidirectional wheel type, an impact or vibration is generated when a rotating direction of an outer wheel is reversed to the front and rear of a barrel wheel, and an impact due to the reversed rotating direction also increases in the vicinity of the barrel wheel as a width of the barrel wheel is small.

DISCLOSURE OF THE INVENTION

The present invention is directed to solving the above-mentioned problems and other drawbacks. Another aspect of the present invention is to provide a wheel capable of moving in all directions, and an omnidirectionally moving robot using the same.

According to one aspect of the present invention, there is provided an omnidirectionally moving wheel, the wheel including a cylindrical body with both open ends, inner wheels each having at least part accommodated in the body, and fixed to each of the both open ends of the body so as to rotate centering on a first rotating axis, and an outer wheel provided on an outside of the body and rotating centering on a second rotating axis intersecting with the first rotating axis. Outermost points of the inner wheels and the outer wheel may be formed at the same distance from a center of the body.

According to one aspect of the present invention, the inner wheels may include first and second inner wheels provided on the both end portions of the body, respectively, and the wheel may further include first and second frames disposed between the first and second inner wheels, formed at the outside of the body, and coupled to each other into a shape corresponding to a shape of the outer wheel.

According to one aspect of the present invention, first and second recess portions may be formed on upper and lower portions of an outer circumferential surface of the body in an inwardly recessed manner, and the first and second frames may be mounted in the first and second recess portions, respectively.

According to one aspect of the present invention, each of the first and second frames may have a shape that a part of a hollow hemisphere is cut.

According to one aspect of the present invention, each of the first and second recess portions may be provided with first and second through holes formed at positions facing each other, and the first and second inner wheels may be fixed to the body by first and second pins inserted through the first and second through holes, respectively.

According to one aspect of the present invention, first and second bottom portions each having a shape of a flat surface may be formed on upper and lower ends of a circumferential surface of the body in an inwardly protruding manner, and the wheel may further include a power transmission unit coupled to the first and second bottom portions to transmit power applied to the wheels.

According to one aspect of the present invention, the power transmission unit may include first and second coupling portions each having a shape of a flat surface and coupled to the respective first and second bottom portions, a connecting portion connecting the first and second coupling portions to each other, and a driving shaft fixed to the connecting portion to transmit power.

According to one aspect of the present invention, the first and second inner wheels may be formed in an elliptical shape.

According to one aspect of the present invention, the first rotating axis and the second rotating axis may be orthogonal to each other.

According to one aspect of the present invention, an angle α formed by lines extending from a center point of the body to the exposed both ends of the first inner wheel or the second inner wheel may be in the range of 60 to 90°.

According to one aspect of the present invention, the outer wheel may have a shape that a spherical shape is cut from a top and a bottom with a plane perpendicular to the second rotating axis.

According to one aspect of the present invention, grooves may be formed on a surface of the first frame, and the first frame may be coupled to the second frame by coupling members.

According to one aspect of the present invention, the power transmission unit may be formed in a shape like an alphabet "C".

According to one aspect of the present invention, a plurality of grooves may be formed on a surface of each inner wheel in a direction parallel to the first rotating axis, and a plurality of grooves may be formed on a surface of the outer wheel in a direction parallel to the second rotating axis.

According to one aspect of the present invention, an active motion may be realized by a rotation of the drive shaft, and the number of discontinuous points by the active motion may be four.

According to one aspect of the present invention, a maximum diameter of the inner wheel may be the same as a radius of the outer wheel.

According to one aspect of the present invention, there is provided a moving robot, including a plurality of wheels movable in an omnidirectional manner, driving units configured to rotate the wheels by transmitting power to the wheels so as to generate an active motion, and a support member connected to the driving units to support the driving units. The plurality of wheels may include at least three wheels. Each of the plurality of wheels may include a cylindrical body with both open ends, and the plurality of wheels may include inner wheels each having at least part accommodated in the body, and fixed to each of the both open ends of the body so as to rotate centering on a first rotating axis, and an outer wheel provided on an outside of the body and rotating centering on a second rotating axis intersecting with the first rotating axis. Outermost points of the inner wheels and the outer wheel may be formed at the same distance from the center of the body.

According to one aspect of the present invention, each wheel may move omnidirectionally by a combination of an active motion by rotation of a driving shaft, and a passive motion by the active motion.

According to one aspect of the present invention, at least one of the wheels may move according to the active motion.

According to one aspect of the present invention, the support member may include an upper plate and a lower plate fixed to the driving units on upper and lower portions of the driving units.

Advantageous Effect

Effects of the mobile terminal and the control method according to the present invention will be described as follows.

According to at least one of the embodiments of the present invention, contact portions with the ground may form the same circle, so as to prevent an impact or vibration occurred during rotation.

According to at least one of the embodiments of the present invention, the body serving as an outer frame may be formed in a cylindrical shape, which may lower a degree of difficulty of fabrication.

According to at least one of the embodiments of the present invention, the number of discontinuous points of the wheel at the time of contacting the ground may be set to four, thereby reducing a frequency of impact.

Further, according to at least one of the embodiments of the present invention, a radius of the inner wheel may be about a half of a size of the outer wheel, so as to reduce a rotating speed of the inner wheel and reduce a maximum value of a rotating speed of the outer wheel accordingly, thereby alleviating an impact caused due to a change of a wheel which is in contact with the ground.

Further scope of applicability of the present invention will become apparent from the following detailed description. However, it will be obviously understood by those skilled in the art that various changes and modifications can be made within the idea and scope of the present invention, and thus it should be construed that the detailed description and specific embodiments like the preferred embodiments of the present invention are merely illustrative.

MODES FOR CARRYING OUT THE PREFERRED EMBODIMENTS

Figure 1:
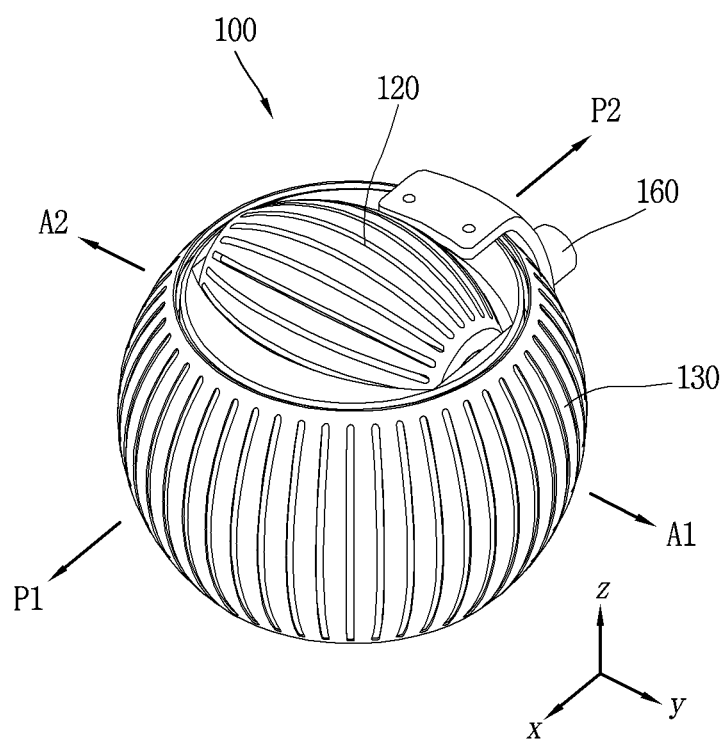
FIG. 1 is a perspective view illustrating a wheel in accordance with one embodiment of the present invention.

Hereinafter, embodiments of the present invention will be described in detail with reference to the accompanying drawings, and the same reference numerals are used to designate the same/like components and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present invention and it should be understood that the idea of the present invention is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a wheel 100 capable of moving in all directions according to one embodiment of the present invention and a robot 200 using the same will be described. It will be apparent to those skilled in the art that the present invention may be embodied in other specific forms without departing from the spirit or essential characteristics thereof.

Figure 2:
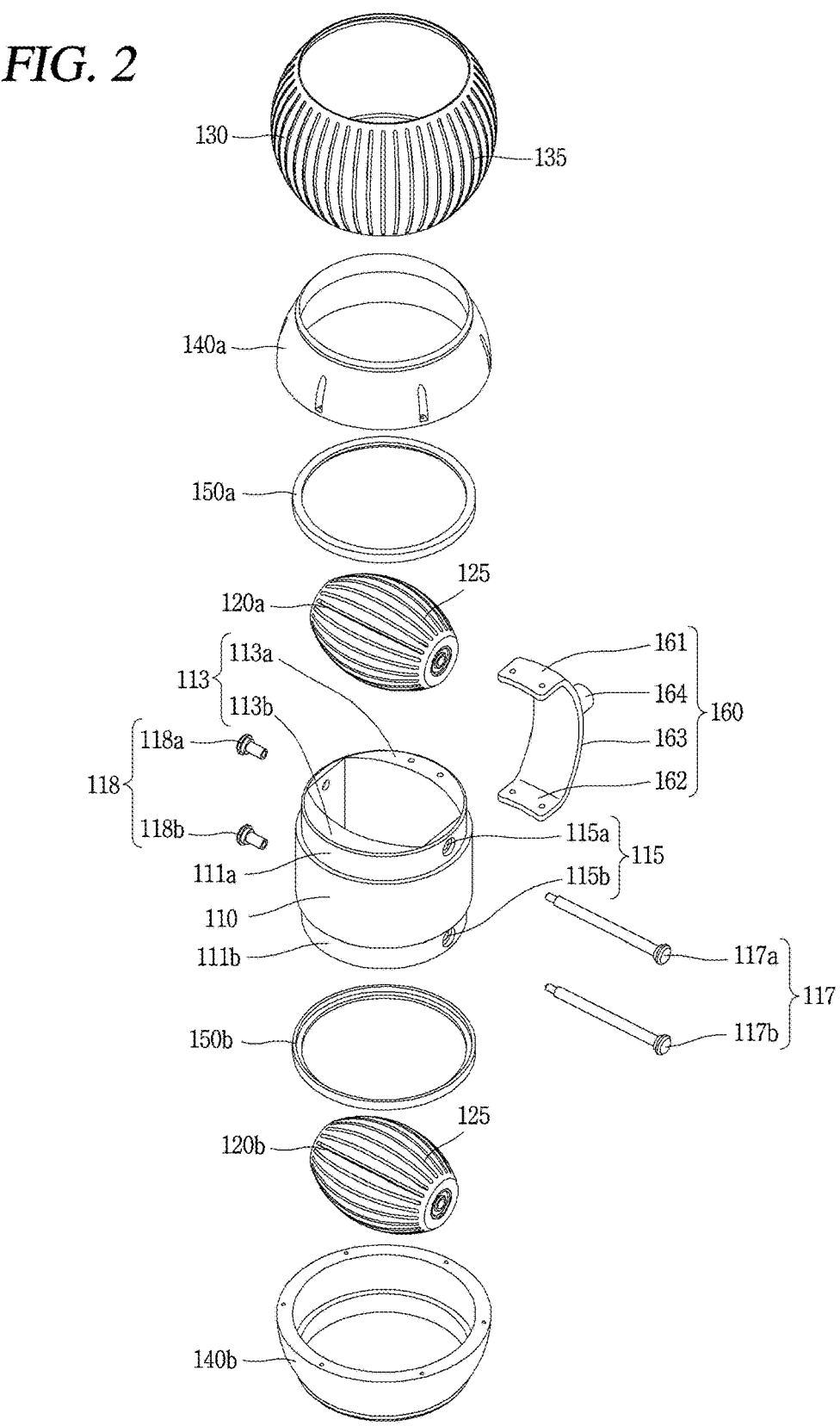
FIG. 2 is an exploded perspective view of FIG. 1.

FIG. 1 is a perspective view of an omnidirectionally moving wheel 100 according to one embodiment of the present invention, and FIG. 2 is an exploded perspective view of FIG. 1.

Referring to FIGS. 1 and 2, an omnidirectionally moving wheel 100 according to one embodiment of the present invention includes a body 110 having a hollow cylindrical shape with both ends opened, an inner wheel 120, and an outer wheel 130.

The body 110 may have a hollow shape, and may preferably be made of one of a carbon filter or a metallic material because there may be a case where it should support weights of the wheel 100 and a moving robot 200 using the wheel 100.

At least part of the inner wheel 120 is rotated with being accommodated in the outer wheel 130. At least part of the inner wheel 120 is accommodated in the body 110. The inner wheel 120 rotates centering on a first rotating axes R11, R12 with being fixed to each of the both open ends of the body 110. The outer wheel 130 is arranged to intersect with the inner wheel 120 and rotates centering on a second rotating axis R2.

The inner wheel 120 includes first and second inner wheels 120a and 120b provided on the both open ends of the body 110, and thus the first and second inner wheels 120a and 120b have rotating axes, respectively. That is, the first inner wheel 120a rotates centering on the first rotating axis R11 and the second inner wheel 120b rotates centering on the first rotating axis R12. Since the rotating axes R11 and R12 of the first and second inner wheels 120a and 120b are parallel to each other, the rotating axes of the first and second inner wheels 120a and 120b are referred to as first rotating axes R11 and R12, and a rotating axis of the outer wheel 130 is referred to as a second rotating axis R2. At this time, the first rotating axes R11 and R12 and the second rotating axis R2 may be perpendicular to each other, for example. The second rotating axis R2 refers to a center axis of rotation when it is assumed that the body 110 is formed by rotating centering on an arbitrary axis, and the first rotating axes R11 and R12 refer to axes perpendicular to the second rotating axis R2. That is, referring to FIG. 1, a direction y is a direction of the first rotating axes R11 and R12, and a direction z is a direction of the second rotating axis R2.

The omnidirectionally moving wheel 100 according to the one embodiment of the present invention is moved by active motion and passive motion, and the moving robot 200 using the omnidirectionally moving wheel 100 is movable omnidirectionally by combination of the active motion and the passive motion. That is, in one embodiment of the present invention, the omnidirectional rotation is enabled by combination of the rotation of the inner wheel 120 and the outer wheel 130.

Here, the active motion refers to that the wheel 100 rotates in response to a driving shaft 164 connected to the wheel 100 being rotated by receiving driving force by virtue of driving units 230a, 230b and 230c to be described later, and the passive motion refers to that rotation or translation is passively caused by the active motion without driving force. However, the passive motion does not refer to passive movement by external force applied by a user or the like but refers to passive movement resulting from the active motion.

That is, when one wheel 100 is primarily moved by the active motion, another wheel 100 is secondarily moved by the passive motion. However, it does not indicate that the passive motion occurs at a time interval after the active motion occurs, but it may be understood that the active motion brings about the passive motion and the active motion and the passive motion occur simultaneously. This may be more clearly understood when a plurality of omnidirectionally moving wheels 100 are provided. This will be described later.

At this time, the open ends of the body 110 correspond to end surfaces of a cylinder, and an approximately half of each inner wheel 120 may be accommodated.

The inner wheel 120 and the outer wheel 130 are brought into direct contact with the ground and thus necessarily require friction with the ground. Therefore, the outermost portions thereof are made of a material such as rubber, urethane, and the like, having great frictional force. The inner wheel 120 and the outer wheel 130 may be understood as tires of a general automobile or the like.

The outer wheel 130 is formed on an outer side of the cylindrical body 110 and is not necessarily formed to be in contact with an outer circumferential surface of the body 110. In order to accommodate the outer wheel 130, a frame 140, which may be brought into close contact with an inner circumferential surface of the outer wheel 130, should be provided. That is, the wheel 100 further includes first and second frames 140a and 140b arranged between the first and second inner wheels 120a and 120b and the outer wheel 130 at the outside of the body 110, and coupled to each other into a shape corresponding to a shape of the outer wheel 130.

The outer wheel 130 has a shape that upper and lower sides are cut from a spherical shape with a plane (xy plane) perpendicular to the second rotating axis R2. The first and second frames 140a and 140b should have a shape corresponding to the outer wheel 130 when coupled to each other. Accordingly, the first and second frames 140a and 140b are formed by cutting upper and lower sides from a hollow sphere with a plane perpendicular to the second rotating axis R2, similar to the outer wheel 130. Thereafter, the first frame 140a and the second frame 140b are formed to have the same size by cutting their center with a plane perpendicular to the second rotating axis R2. That is, the first and second frames 140a and 140b are formed in a shape that a hollow hemisphere is cut from an end portion, and are provided to support the outer wheel 130. Therefore, the first and second frames 140a and 140b are preferably made of one of polycarbonate (PC), a carbon filter or a metallic material.

Figure 3A:
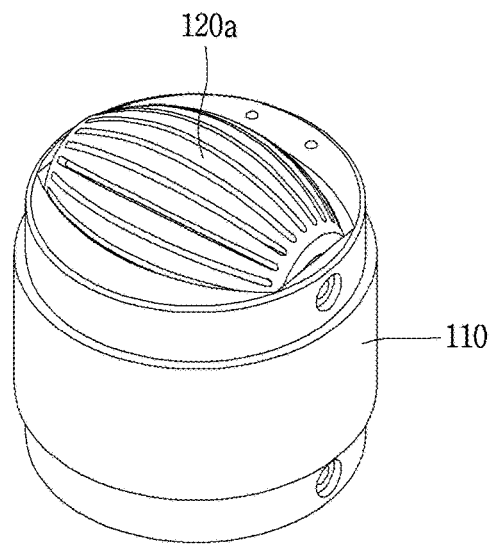
FIGS. 3A to 3C are views illustrating a coupling order of wheels according to one embodiment of the present invention.
Figure 3B:
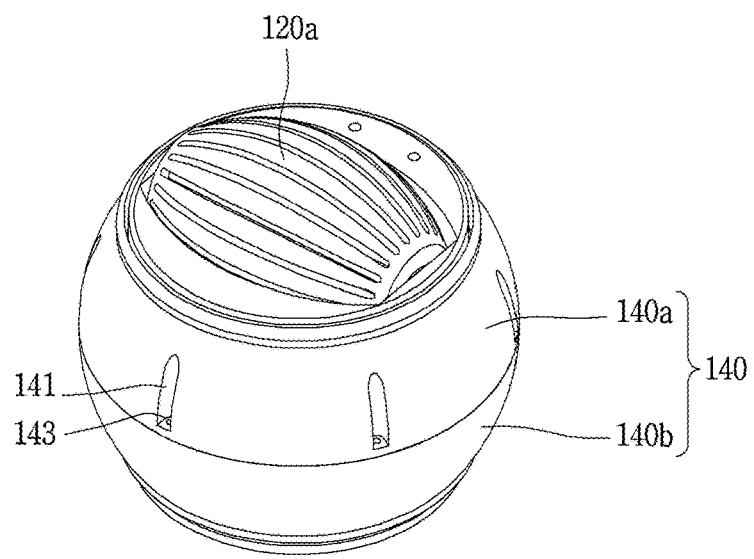

In order to couple the first and second frames 140a and 140b, the first frame 140a is provided with grooves 141 formed on a surface thereof and is coupled to the second frame 140b by coupling members 143 such as bolts (see FIG. 3B). In this manner, the reason why the frame is formed by the divided first and second frames 140a and 140b is because the frame having an approximately spherical shape is difficult to be coupled.

The first and second inner wheels 120a and 120b have approximately elliptical shapes each having both ends cut off, and are coupled to upper and lower ends of the body 110 so as to be rotated centering on the first rotating axes R11 and R12. At this time, at least part of each of the first and second inner wheels 120a and 120b is accommodated in the body 110. A part of an inner circumferential surface of the body 110 is formed to be flat such that both ends of each of the first and second inner wheels 120a and 120b can be accommodated in the body 110.

First and second recess portions 111a and 111b recessed into the body 110 are formed on upper and lower portions of an outer circumferential surface of the body 110. The first and second inner wheels 120a and 120b are coupled to the first and second recess portions 111a and 111b and the first and second frames 140a and 140b are mounted on the first and second recess portions 111a and 111b, respectively. The first and second recess portions 111a and 111b are formed along the circumference of the body 110.

In order to couple the first and second inner wheels 120a and 120b to the body 110, the first and second recess portions 111a and 111b are provided with a pair of through holes, respectively, for example, a pair of first through holes 115a and a pair of second through holes 115b, at positions facing each other. At this time, the through holes formed to face each other may have different sizes from each other.

The first and second inner wheels 120a and 120b are fixed to the body 110 by inserting first and second pins 117a and 117b through the first and second through holes 115a and 115b, respectively. Head portions of the first and second pins 117a and 117b are formed to be larger than the first and second through holes 115a and 115b so that only body portions of the first and second pins 117a and 117b are inserted into the body 110. End portions of the first and second pins 117a and 117b are coupled to first and second coupling members 118a and 118b, which are coupled to the body 110 from the outside of the body 110. Accordingly, the first and second pins 117a and 117b are fixed to the body 110. The coupling member 118 may be any member that can receive the pin 117.

When the elliptical first and second inner wheels 120a and 120b are seated on the open end portions of the body 110, an empty space is generated between a circumferential surface of the body 110 and the first and second inner wheels 120a and 120b. Since foreign substances such as dust and the like may be introduced into the empty space, the space should be reduced. To this end, each of the upper and lower ends of the body 110 are provided with first and second bottom portions 113a and 113b protruding inward from the circumferential surface. The pair of bottom portions 113 is in a shape similar to of a bow or a crescent.

Meanwhile, in one embodiment of the present invention, the wheel 100 may further include a power transmission unit 160 having both ends coupled to the first and second bottom portions 113a and 113b to transmit power transmitted to the wheel 100. The power transmission unit 160 is configured to transfer not only rotational force by a motor but also power by the passive motion. That is, the power transmission unit 160 transmits power by active motion and power by passive motion. Since the first and second bottom portions 113a and 113b are formed in a flat surface, an area where the power transmission unit 160 can be fixed is provided.

The power transmission unit 160 includes first and second coupling portions 161 and 162 formed in a flat shape to be coupled to the first and second bottom portions 113a and 113b, a connecting portion 163 connecting the first and second coupling portions 161 and 162, and a driving shaft 164 fixed to the connecting portion 163 to transmit power. The first and second coupling portions 161 and 162 and the connecting portion 163 may be integrally formed with each other, and the driving shaft 164 may also be integrally formed with the connecting portion 163. Since the power transmission unit 160 should be coupled to the body 110 while being spaced apart from the outer wheel 130, the connecting portion 163 may have a shape corresponding to the outer wheel 130. The driving shaft 164 is connected to a driving unit 230a, 230b, 230c having a motor.

The power transmission unit 160 is fixed to both ends of the wheel 100, instead of being coupled to only one point of the wheel 100, so as to have improved coupling strength. In other words, the power transmission unit 160 may be fixed to the upper and lower ends of the body 110, thereby being firmly connected to the body 110. The power transmission unit 160 has a shape similar to an alphabet "C".

Figure 3C:
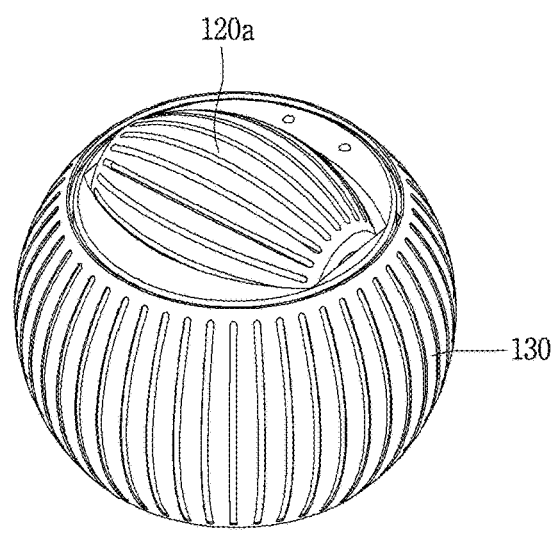

FIGS. 3A to 3C illustrate a part of a coupling process of the wheel 100 according to the one embodiment of the present invention, and do not illustrate a disassembled state (see FIG. 2) and a coupled state (see FIG. 1) of every component. FIG. 3A illustrates a state where the first inner wheel 120a is inserted into the upper end of the cylindrical body 110. After the coupled state illustrated in FIG. 3A, the second inner wheel 120b is inserted into the lower end of the body 110, and then the first and second inner wheels 120a and 120b are fixed by the first and second pins 117a and 117b. Since the first inner wheel 120a has an elliptical shape, it has a minor axis a and a major axis b. Since the first rotating axis R11, R12 must extend over the first recess portion 111a, an externally-exposed portion of the first inner wheel 120a is somewhat smaller than half of the minor axis a. At this time, since the first and second inner wheels 120a and 120b must rotate without affecting each other, they are prevented from contacting each other within the body 110 (see FIG. 7). That is, a size of the minor axis a of each of the second inner wheels 120a and 120b may be a size of a radius of the outer wheel 130 at the maximum.

FIG. 3B illustrates that the first and second frames 140a and 140b of FIG. 3A are in a coupled state. The first and second frames 140a and 140b are coupled to the upper and lower sides of the body 110, more specifically, to the first and second recess portions 111a and 111b of the body 110. The first and second frames 140a and 140b may also be coupled by an adhesive or the like. In one embodiment of the present invention, the first and second frames 140a and 140b are coupled to each other by the coupling members 143 such as bolts or the like through the plurality of grooves 141 formed on the first frame 140a.

FIG. 3C illustrates a state in which the outer wheel 130 is additionally inserted in the state of FIG. 3B. The outer wheel 130 occupies most of a contact portion with the ground, and is provided perpendicular to the first and second inner wheels 120a and 120b. In addition, the first and second inner wheels 120a and 120b and the outer wheel 130 are provided with grooves 125 and 135 (see FIG. 2) to prevent from slipping when contacting the ground. The grooves 125 and 135 are formed at predetermined intervals. The grooves 125 and 135 are formed in a direction parallel to the first rotating axes R11 and R12 on the first and second inner wheels 120a and 120b, and in a direction parallel to the second rotating axis R2 on the outer wheel 130. In this manner, by forming the grooves 125 and 135, frictional force of the wheel 100 can be improved upon being brought into contact with the ground, thereby enabling rotation without slippage.

However, the formation direction of the grooves 125 and 135 may not be necessarily limited to that. The grooves 125 and 135 may alternatively be formed in a direction perpendicular to the first rotating axes R11 and R12 on the first and second inner wheels 120a and 120b, and in a direction perpendicular to the rotating axis R2 on the outer wheel 130.

Figure 4:
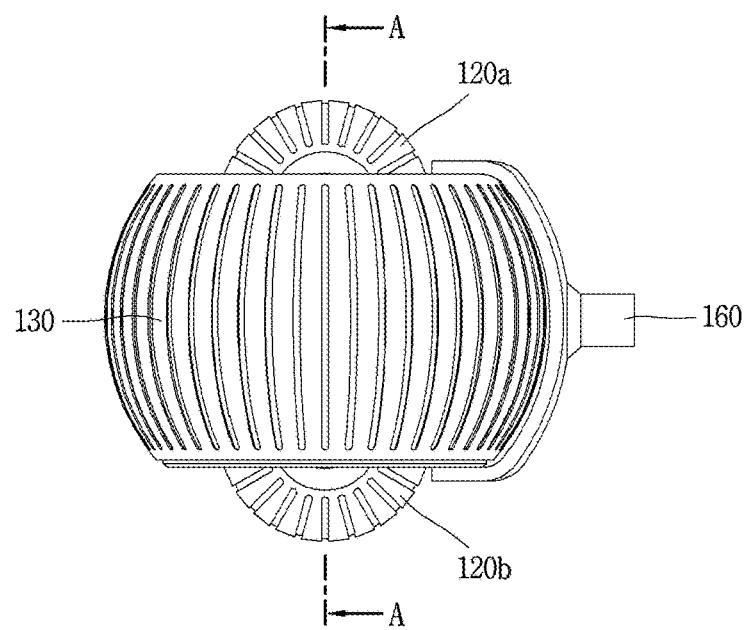
FIG. 4 is a planar view of the wheel according to the one embodiment of the present invention when viewed from a first direction.
Figure 5:
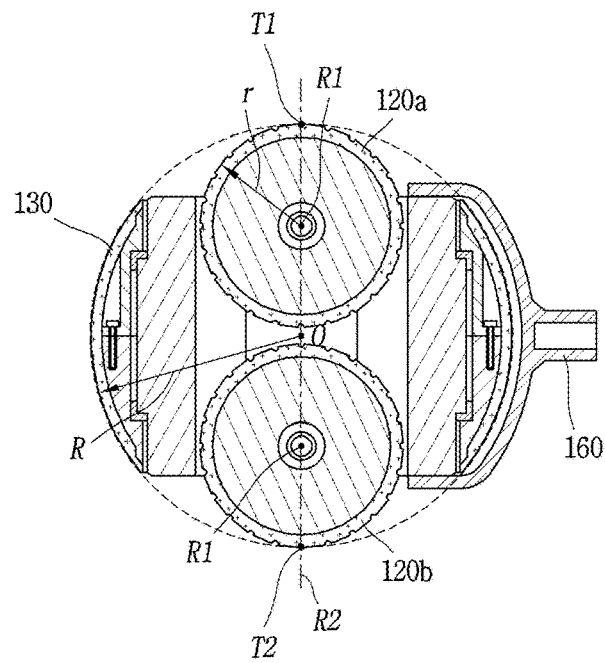
FIG. 5 is a sectional view taken along a line AA of FIG. 4.
Figure 6:
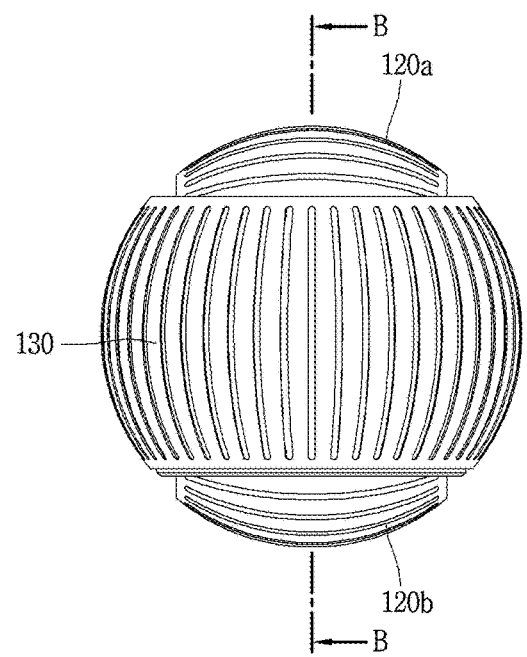
FIG. 6 is a planar view of the wheel according to the one embodiment of the present invention when viewed from a second direction.
Figure 7:
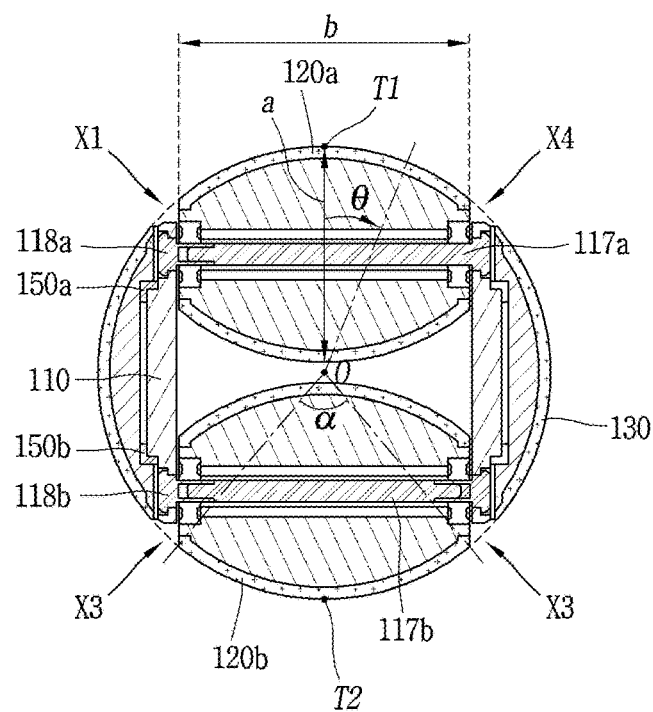
FIG. 7 is a sectional view taken along a line BB of FIG. 6.

FIG. 4 is a planar view of the wheel 100 according to the embodiment of the present invention when, viewed from a first direction, and FIG. 5 is a sectional view taken along a line AA of FIG. 4. FIG. 6 is a planar view of the wheel 100 according to the one embodiment of the present invention, when viewed from a second direction, and FIG. 7 is a sectional view taken along a line BB of FIG. 6.

The lines AA and BB of FIGS. 4 and 6 may be understood as the second rotating axis R2. FIG. 4 is a view viewed from a left or right side of the power transmission unit 160, and FIG. 6 is a view viewed from an opposite side of the power transmission unit 160. FIG. 5 is a cut sectional view of the wheel 100 according to the embodiment of the present invention including an xz plane. FIG. 7 is a cut sectional view of the wheel 100 according to the one embodiment of the present invention including an yz plane. In one embodiment of the present invention, in order to minimize an impact or vibration during rotation according to active or passive motion, as illustrated in FIGS. 5 and 7, outermost points of the first and second inner wheels 120a and 120b are located at the same distance from a center O of the body 110. In other words, the outermost points of the first and second inner wheels 120a and 120b exist on a curved surface formed by extending the outer circumferential surface of the outer wheel 130.

In one embodiment of the present invention, a maximum diameter 2r of the first and second inner wheels 120a and 120b may be correspond to a radius R of the outer wheel 130. The maximum diameter 2r of each of the first and second inner wheels 120a and 120b may preferably be the same as the radius R of the outer wheel 130. This is allowed because the inside of the body 110 is empty without a structure. In this instance, the maximum diameter of the first and second inner wheels 120a and 120b, as illustrated in FIG. 5, refers to a diameter of the first and second inner wheels 120a and 120b when the wheel 100 is cut along a zx plane including the center O of the wheel 100.

As illustrated in FIG. 5, points T1 and T2, which are the farthest from the first rotating axes R11 and R12, of the first and second inner wheels 120a and 120b are brought into contact with an extended surface of the outer wheel 130. Here, the extended surface of the outer wheel 130 refers to a surface of a sphere in a state before being cut off when considering that the outer wheel 130 is formed by cutting upper and lower portions from the sphere into a crescent shape. That is, the extended surface refers to a surface of an arcuate portion of the crescent shape.

As such, in one embodiment of the present invention, the first and second inner wheels 120a and 120b may be brought into contact with the extended surface of the outer wheel 130 so that the first inner wheel 120a and the extended surface of the outer wheel 130 are brought into contact with each other at the contact point T1 and the second inner wheel 120b and the extended surface of the outer wheel 130 is brought into contact with each other at the contact point T2. This will be more obvious in FIG. 7.

FIG. 7 is a cut sectional view of the wheel 100 according to the one embodiment of the present invention, including a yz plane. In one embodiment of the present invention, as illustrated in FIG. 7, when the wheel 100 is cut along the plane (yz plane) including the first rotating axes R11 and R12 and the second rotating axis R2, the first and second inner wheels 120a and 120b and the outer wheel 130 form a part of a circle. Since the driving shaft 164 rotates centering on the x axis to realize an active motion, when the active motion occurs, a portion formed on the yz plane is a portion that contacts the ground during rotation by the active motion. At this time, in order for the contact portion with the ground to have continuity, the outermost portions of the first and second inner wheels 120a and 120b and the outer wheel 130 preferably form one circle. However, in this case as well, discontinuous points are generated, which are X1, X2, X3 and X4, as illustrated in FIG. 7. That is, the one embodiment of the present invention merely illustrates four discontinuous points formed by the active motion.

The contact portion of each of the first and second inner wheels 120a and 120b with the ground has a shape corresponding to the arcuate portion of the crescent shape cut from the spherical shape. Therefore, as illustrated in FIG. 7, the contact portion of each of the first and second inner wheels 120a and 120b with the ground is substantially similar to the arcuate portion of the cut crescent shape. However, the first and second inner wheels 120a and 120b merely replace a function of the cut crescent shape, and do not have the same shape. In this manner, in one embodiment of the present invention, as illustrated in FIG. 7, when the wheel 100 rotates centering on the x axis, an outer shape of the wheel 100 is maintained in a circular shape such that the contact portion with the ground is naturally connected. At this time, when the wheel 100 rotates centering on the x axis, the discontinuous points of the contact portion with the ground are X1, X2, X3 and X4. These points are formed at boundary portions between the first and second inner wheels 120a and 120b and the outer wheel 130.

Meanwhile, the discontinuous points may appear at a time point when the contact portion with the ground is switched from the first inner wheel 120a or the second inner wheel 120b to the outer wheel 130, or a time point when the contact portion with the ground is switched from the outer wheel 130 to the first inner wheel 120a or the second inner wheel 120b.

When the first or second inner wheel 120a or 120b moves in contact with the ground, the first or second inner wheel 120a or 120b should have faster rotating speed in order to move at the same speed as its minor axis a and the major axis b of each of the first and second inner wheels 120a and 120b become smaller. For example, if it is assumed that a turning radius of the outer wheel 130 is R and a turning radius of each of the first and second inner wheels 120a and 120b is r, the rotating speed of the first and second inner wheels 120a and 120b must be faster than that of the outer wheel 130, in order for the wheel 100 to move at speed V in the direction of the x axis. In this instance, if the rotating speed of the outer wheel 130 is Rpm1 and the rotating speed of the first and second inner wheels 120a and 120b is Rpm2, Rpm1<Rpm2 is satisfied. Also, Rpm2 should increase more in order to maintain the same speed V as the turning radius r becomes smaller. In this manner, when the turning radius of each of the first and second inner wheels 120a and 120b becomes smaller, a difference in rotating speed between the first and second inner wheel 120a and 120b and the outer wheel 130 increases. Accordingly, in order to minimize a rattling impact or vibration due to the difference of the rotating speeds Rpm1 and Rpm2 at the time point when the contact portion with the ground is switched from the first inner wheel 120a or the second inner wheel 120b to the outer wheel 130, the turning radius of each of the first and second inner wheels 120a and 120b should be similar to that of the outer wheel 130.

Meanwhile, the portion, which is exposed to outside so as to be in contact with the ground, of each of the first and second inner wheels 120a and 120b in FIG. 7 should have the approximately crescent shape, and thus the size of the minor axis a of each of the first and second inner wheels 120a and 120b cannot be adjusted irrespective of the size of the major axis b.

In one embodiment of the present invention, if it is assumed that the center of the wheel 100 is set to 0 and an angle formed by lines extending from the center O to both exposed ends of the first inner wheel 120a or the second inner wheel 120b is referred to as a, the a is in the range of 60~90°. At this time, the both ends roughly refer to portions fixed to the body 110. The center of the wheel 100 is the same as the center of the body 110.

If the angle α is smaller than 60°, the turning radius of each of the first and second inner wheels 120a and 120b is reduced, and thereby an impact is caused on the entire wheel 100 when switching the contact portion with the ground from the outer wheel 130 to the first inner wheel 120a or the second inner wheel 120b. In this case, when using the robot 200 using the wheel 100, undesirable shaking may occur due to such impact, thereby causing inconvenience.

On the other hand, when the angle α is greater than 90°, the first and second inner wheels 120a and 120b are deeply inserted into the body 110 and thereby overlap each other within the body 110. If the size of the minor axis a of each of the first and second inner wheels 120a and 120b is reduced to avoid such problem, a maximum height of the wheel 100 from the ground differs when the contact portion with the ground is switched from the outer wheel 130 to the first inner wheel 120a or the second inner wheel 120b. That is, when the minor axis a of the first inner wheel 120a or the second inner wheel 120b is made small, as illustrated in FIG. 7, the first and second inner wheels 120a and 120b and the outer wheel 130 cannot form one circle. Accordingly, the center of the wheel 100 is not formed at a predetermined height from the ground during the active motion, thereby causing a feeling of rattling or moving along a rough surface. Therefore, in one embodiment of the present invention, the angle α is limited to the range of 60 to 90°.

At this time, the angle α is relating to the diameter (minor axis a) and a width (major axis b) of each of the first and second inner wheels 120a and 120b. That is, the minor axis a and the major axis b increase in size as the angle α increases, and decreases as the angle α decreases. In one embodiment of the present invention, the difference in rotating speed between the first and second inner wheels 120a and 120b and the outer wheel 130 has been reduced as much as possible by designing the first and second inner wheels 120a and 120b to have the maximum diameter (minor axis a) and width (major axis b). This has resulted in alleviating an impact caused when changing a wheel contacting the ground while traveling in one direction. This will be described later.

As illustrated in FIG. 7, first and second bushings 150a and 150b are provided between the body 110 and the first and second frames 140a and 140b.

FIGS. 8A to 8D are views illustrating an active motion of the wheel 100 according to the one embodiment of the present invention, and FIGS. 9A to 9D are views illustrating a passive motion of the wheel according to the one embodiment of the present invention. A moving direction of the wheel 100 by the active motion is a direction A1 or A2 in FIG. 1, and a moving direction of the wheel 100 by the passive motion is a direction P1 or P2 in FIG. 1.

Figure 8A:
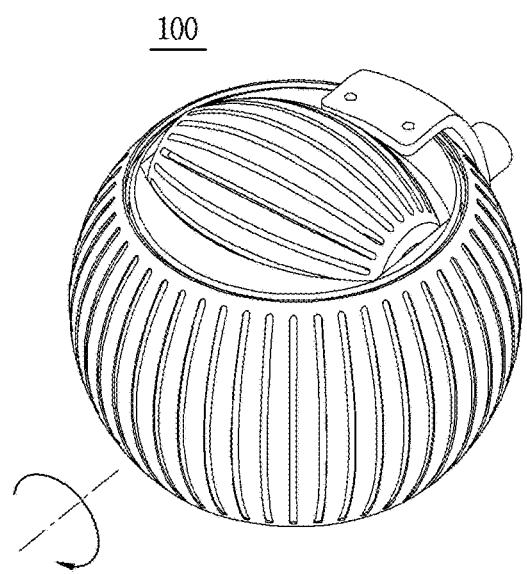
FIGS. 8A to 8D are views illustrating an active motion of the wheel according to the one embodiment of the present invention.
Figure 8B:
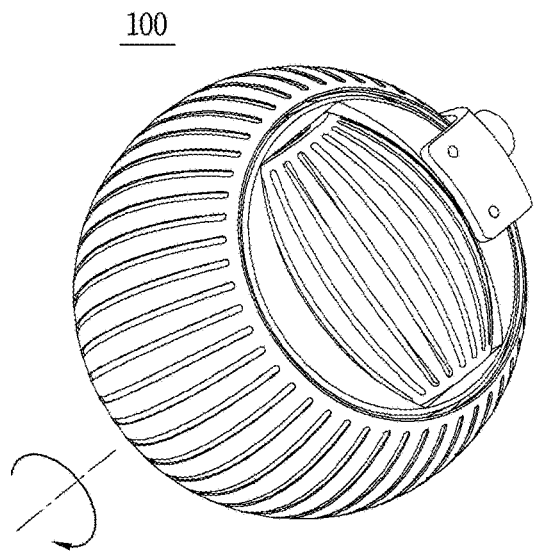
Figure 8C:
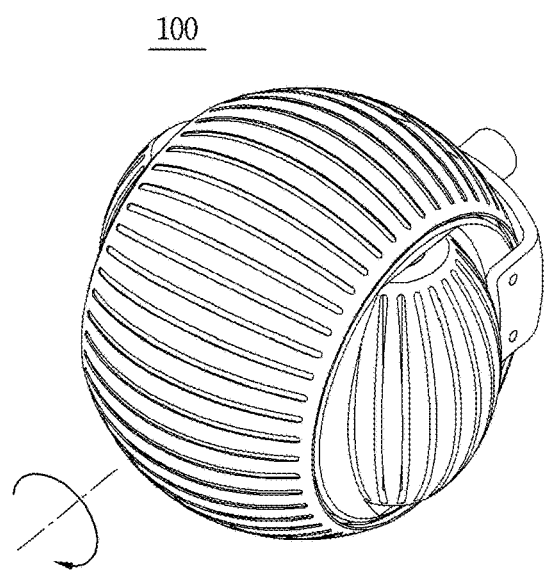
Figure 8D:
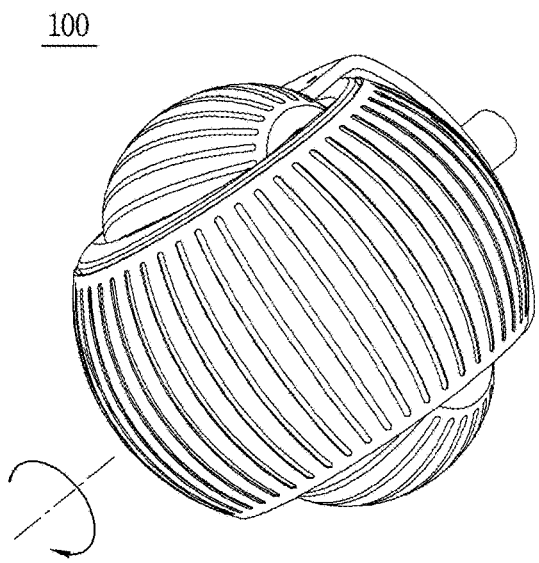

First, FIGS. 8A to 8D are views illustrating the active motion in the direction A1 in FIG. 1. The active motion is a motion that the wheel 100 is rotated centering on the driving shaft 164 by being driven by a motor or the like. That is, a motion that the wheel 100 is rotated centering on the x axis so as to move along the y axis is illustrated. FIG. 8A illustrates a state in which a central portion of the exposed portion of the second inner wheel 120b (see T2 in FIG. 7) is in contact with the ground, namely, a state in which the wheel 100 moves due to the contact between the second inner wheel 120b and the ground. FIG. 8B illustrates a time point at which the contact portion with the ground is switched from the second inner wheel 120b to the outer wheel 130. The contact portion with the ground is the point X3 in FIG. 7. At this time, since the contact portion with the ground is switched from the second inner wheel 120b to the outer wheel 130, a slight impact occurs. FIG. 8C illustrates a rotated state after the contact portion with the ground is completely switched to the outer wheel 130. Even at this time, the surface of the outer wheel 130 should be rotated with the same turning radius in order to minimize the impact due to the contact with the ground. For this, the outer wheel 130 may be understood as a state that a part of a sphere is cut off as described above. FIG. 8D illustrates a time point at which the contact portion with the ground is switched from the outer wheel 130 to the first inner wheel 120a. The contact portion of the wheel 100 with the ground is the point X4 in FIG. 7. At this time, since the turning radius of the outer wheel 130 is great, the rotating speed of the first inner wheel 120a for maintaining the same speed should be faster than the rotating speed of the outer wheel 130. In order to minimize the rotating speed of the first inner wheel 120a, in one embodiment of the present invention, the minor axis a and the major axis b of the first inner wheel 120a have been designed as great as possible.

FIGS. 9A to 9D illustrate that the wheel 100 performs a passive motion of moving forward along the x axis.

Figure 9A:
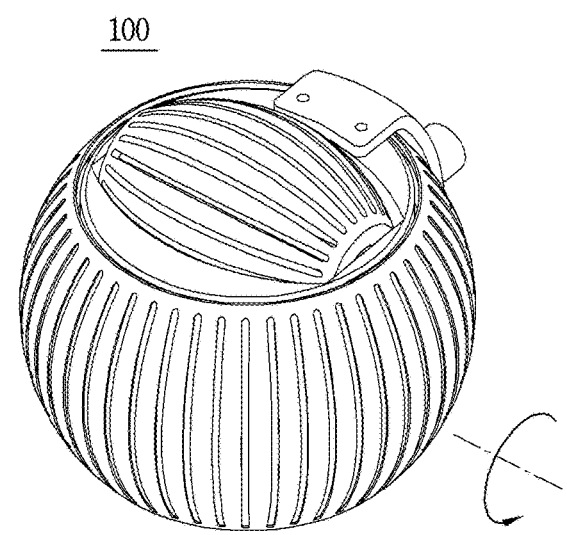
FIGS. 9A to 9D are views illustrating a passive motion of the wheel according to the one embodiment of the present invention.

Explaining this in more detail, FIG. 9A illustrates a state in which the second inner wheel 120b rotates centering on the first rotating axis R11, R12 while the outermost portion (see T2 of FIG. 7) of the second inner wheel 120b is brought into contact with the ground. If there is no rotation of the driving shaft 164, the second inner wheel 120b moves forward along the x axis.

Figure 9B:
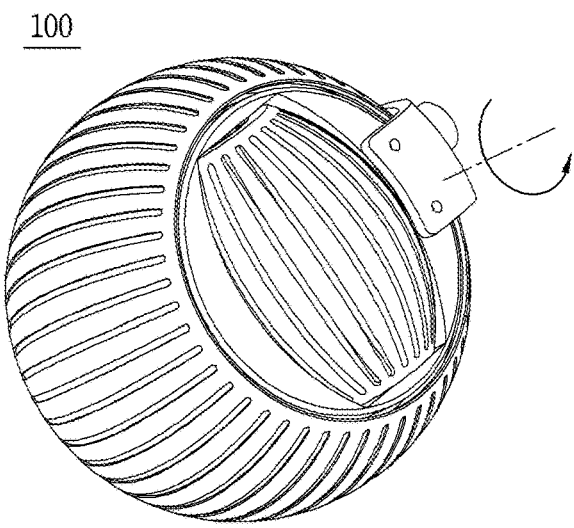
Figure 9C:
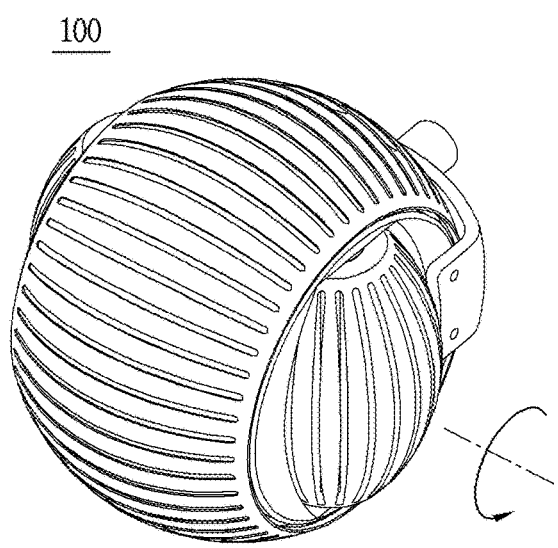
Figure 9D:
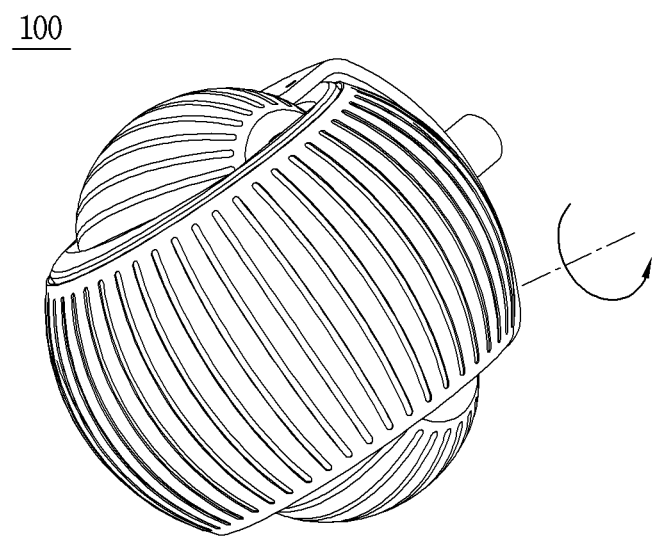

FIG. 9B illustrates a state of performing a passive motion for moving forward in the x axis direction. FIG. 9B illustrates that the outer wheel 130 moves forward in the x axis direction in a state where a frictional portion with the ground is switched from the second inner wheel 120b to the outer wheel 130 which is the same state as that of FIG. 8B. That is, FIG. 9B illustrates a state in which the frictional portion with the ground is the point X3 illustrated in FIG. 7. FIG. 9C illustrates that the outer wheel 130 moves forward in the x axis direction in a state in which the frictional portion with the ground is completely switched to the outer wheel 130. In this instance, the outer wheel 130 rotates centering on the second rotating axis R2 while contacting the ground, as illustrated in FIG. 9B. Also, FIG. 9D illustrates a state in which the contact portion with the ground is switched from the outer wheel 130 to the first inner wheel 120a, namely, a state in which the contact portion with the ground is the point X4 illustrated in FIG. 7.

FIGS. 9A to 9D consider only the passive action without considering the active motion. If no rotation is made by the active motion in each state illustrated in FIGS. 9A to 9D, the first inner wheel 120a moves forward long the x axis in each state illustrated in FIGS. 9A to 9D. At this time, if external force for moving the wheel 100 forward along the x axis while the active motion illustrated in FIGS. 8A to 8D is performed, the wheel 100 may move along the xy plane.

Hereinafter, description will be given of a case where the driving shaft 164 rotates when the wheel 100 is moved by the passive motion.

As illustrated in FIGS. 9A to 9D, if the active motion is not performed, a type of wheel contacting the ground does not change. On the other hand, if there is a wheel performing the active motion, this affects another wheel 100.

Referring back to FIGS. 1 and 7, a case where the contact portion with the ground is switched from the outer wheel 130 to the second inner wheel 120b and then switched from the second inner wheel 120b to the outer wheel 130 will be described. When the wheel 100 rotates centering on the x axis while moving forward along the x axis, the contact portion with the ground is discontinued at the points X3 and X4. At this time, it is assumed that speed of moving forward along the x axis is V, rotating speed of the outer wheel 130 is Rpm1, and rotating speed of the second inner wheel 120b is Rpm2. Since the wheel 100 is moving forward along the x axis, the rotating speed of the outer wheel 130 changes from +Rpm1 to −Rpm1 in response to the wheel 100 rotating centering on the x axis. At this time, the rotating speed of the second inner wheel 120b is +Rpm2. Although the rotating speed of the second inner wheel 120b may be somewhat different at the point X3, the rotating direction thereof is the same and thus a large impact does not occur. However, at the point X4, the rotating direction of the outer wheel 130 should be opposite to the rotating direction at the point X3. In this case, when the portion of the second inner wheel 120b is smaller, the rotating direction of the outer wheel 130 must be switched to the opposite direction within a short time. In this case, an impact or vibration is caused on the wheel 100.

If the contact portion of the second inner wheel 120b with the ground is small, the rotating direction of the outer wheel 130 instantaneously changes. To suppress the instantaneous change in one embodiment of the present invention, the minor axis a and the major axis b of each of the first and second inner wheels 120a and 120b have increased as great as possible to reduce rotational inertia of the outer wheel 130. As a result, the impact caused due to the inversion of the rotating direction of the outer wheel 130 is alleviated.

Figure 10A:
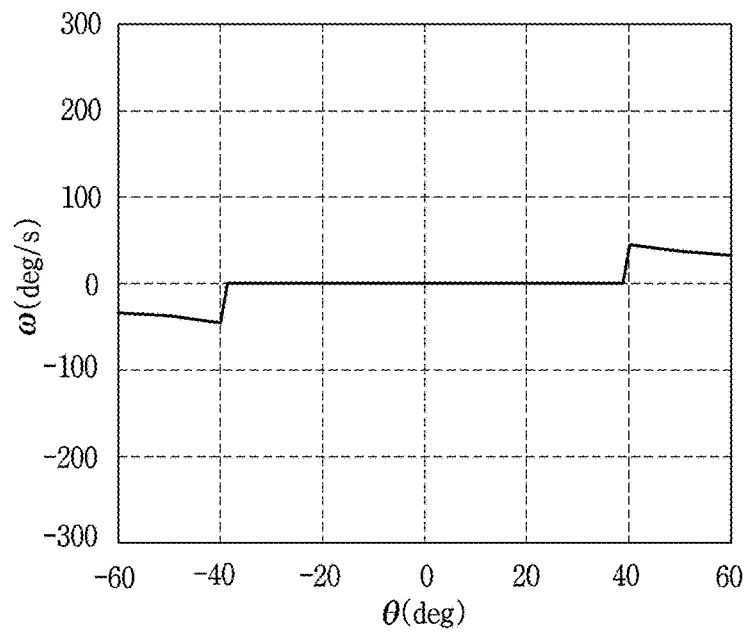
FIG. 10A is a graph showing a change in speed of an outer wheel according to an angle of the wheel according to the one embodiment of the present invention.
Figure 10B:
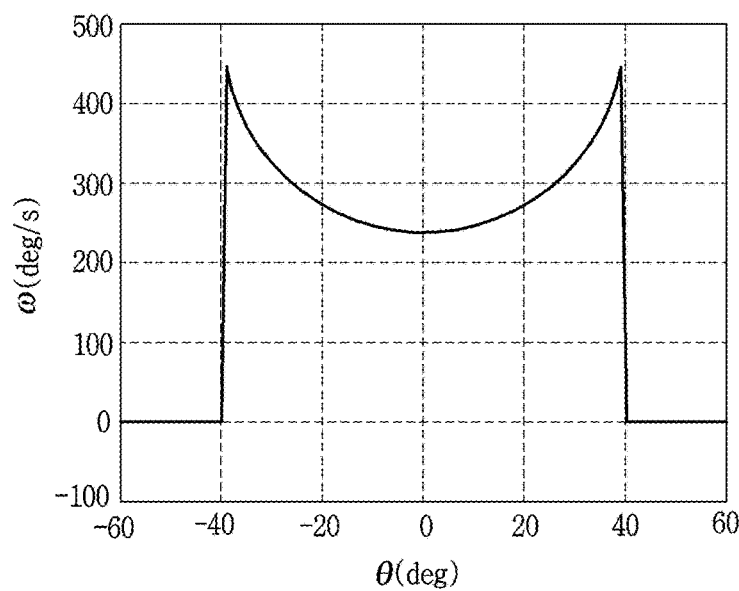
FIG. 10B is a graph showing a change in speed of an inner wheel according to an angle of the wheel according to the one embodiment of the present invention.

FIG. 10A is a graph showing a change in speed of the outer wheel 130 with respect to an angle of the wheel 100 according to one embodiment of the present invention, and FIG. 10B is a graph showing a change in speed of the inner wheel 120 with respect to the angle of the wheel 100 according to one embodiment of the present invention.

That is, FIGS. 10A and 10B are graphs showing rotating speeds of the outer wheel 130 and the inner wheel 120 with respect to the change in position of the wheel 100 in contact with the ground according to one embodiment of the present invention. More specifically, as illustrated in FIG. 7, FIGS. 10A and 10B are graphs showing angular velocity of the outer wheel 130 or the inner wheel 120 when a point, which is spaced apart by an angle θ from the second rotating axis R2 (z axis) passing through the center O of the body 110, is moved with being in contact with the ground. FIGS. 10A and 10B are views illustrating a case where the angle α is 80°, namely, a case where the wheel 100 performs the passive motion along the x axis direction.

Referring to FIG. 10A, the outer wheel 130 is not brought into contact with the ground until the contact portion with the ground is spaced by 40° from the front and rear of the second rotating axis R2, and accordingly the outer wheel 130 is in a stopped state. On the other hand, the outer wheel 130 rotates within a range of ±40° or more from the second rotating axis R2. Also, referring to FIG. 10B, the inner wheel 120 rotates when the contact portion with the ground is within the range of ±40° from the front and rear of the second rotating axis R2, and is stopped within the range of ±40° or more.

At this time, as illustrated in FIG. 10A, the angular velocities have negative and positive values, respectively, in case where an angle with the second rotating axis R2 is a negative (−) value and in case where the angle with the second rotating axis R2 is a positive (+) value. If only the passive motion is performed without the active motion and the wheel 100 is tilted in a±y axis direction while moving forward in the x axis direction, the contact portion with the ground is switched from the inner wheel 120 to the outer wheel 130. At this time, when tilted in the +y direction, one point of the outer wheel 130 located at a right side of the inner wheel 120 is brought into contact with the ground. On the other hand, when tilted in the −y direction, one point of the outer wheel 130 located at a left side of the inner wheel 120 is brought into contact with the ground. The outer wheel 130 rotates, starting from an initial contact point after the switching to the outer wheel 130. Here, the contact point of the outer wheel 130 differs according to a tilting direction of the inner wheel 120 and accordingly the rotating direction of the outer wheel 130 differs. As a result, a type of wheel brought into contact with the ground is changed in the vicinity of ±40° as illustrated in FIG. 10A, and the rotating direction of the outer wheel 130 is changed when continuously moving forward along one direction. This is the same as that a rotating direction of a cylinder is opposite when viewed from left and right sides of the rotating cylinder. That is, this is a principle that the cylinder rotates clockwise when viewed from the left and rotates counterclockwise when viewed from the right.

In FIG. 10B, the type of wheel brought into contact with the ground is changed in the vicinity of +40°. In the range of −40° to +40°, the inner wheel 120 rotates while being brought into contact with the ground.

Referring to FIGS. 10A and 10B, only the outer wheel 130 is brought into contact with the ground in the range of −40° or more, only the inner wheel 120 is brought into contact with the ground in the range of −40° to +40°, and only the outer wheel 130 is brought into contact with the ground in the range of +40° or more. In this way, an impact occurs on the wheel 100 due to the change in the type of wheel in contact with the ground in the vicinity of ±40°, and the present invention has proposed the size of the inner wheel 120 for alleviating the impact in the one embodiment. That is, when the center of the wheel 100 is O and an angle formed by lines extending from the center O to both ends of an externally-exposed portion of the first inner wheel 120a or the second inner wheel 120b is a, the size of the angle α has been set to be in the range of 60° to 90°.

Also, in FIG. 10A, the change in the rotating speed of the outer wheel 130 is not great when the outer wheel 130 is in contact with the ground. However, in FIG. 10B, when the inner wheel 120 is in contact with the ground, the change in the rotating speed of the inner wheel 120 is relatively great. This indicates that the turning radius of the outer wheel 130 hardly changes but the turning radius of the inner wheel 120 continuously changes. Referring back to FIG. 5, it can be seen that the turning radius of the outer wheel 130 may vary slightly depending on the contact portion with the ground.

The turning radius in one embodiment of the present invention refers to a distance from the first rotating axes R11 and R12 or the second rotating axis R2 of the wheel 100 to the contact portion with the ground.

Similarly, the radius of each of the first and second inner wheels 120a and 120b is r, and the turning radius thereof varies depending on the contact position and contact state with the ground. For example, when the points T1 and T2 in FIG. 5 rotate while being in contact with the ground, the turning radius of each of the first and second inner wheels 120a and 120b is r. However, as illustrated in FIG. 7, when the point of the first inner wheel 120a that is spaced apart by θ from the second rotating axis R2 rotates while being in contact with the ground, the first inner wheel 120a rotates centering on the first rotating axis R11, R12. Accordingly, the turning radius thereof is ½ (a1) and thus is smaller than r (=½ (a)). However, as the contact portion of the first inner wheel 120a with the ground moves close to T1, the turning radius thereof gradually increases from ½ (a1) to ½ (a), and thus the rotating speed of the first inner wheel 120a gradually decreases so as to have the lowest rotating speed when passing through the point T1. Afterwards, when the first inner wheel 120 is getting farther away from the second rotating axis R2 after passing through T1, the turning radius of the first inner wheel 120a gradually decreases again and the rotating speed gradually increases again.

In this manner, as the contact point of the wheel 100 is changed, the turning radius of the wheel 100 is changed and the rotating speed is changed accordingly. The one embodiment of the present invention has illustrated that the diameter and width of each of the first and second inner wheels 120a and 120b are designed to be as large as possible so that the rotating speed of each of the first and second inner wheels 120a and 120b and the outer wheel 130 can be maintained as low as possible so as to alleviate an impact caused due to the change of a wheel in contact with the ground. That is, the width of each of the first and second inner wheels 120a and 120b is designed to be maximized so as to minimize the size and rotational inertia of the outer wheel 130, thereby minimizing the impact caused due to the inversion of the rotating direction of the outer wheel 130.

Also, the present invention provides a robot 200 using the omnidirectionally moving wheel 100 in accordance with one embodiment.

Figure 11:
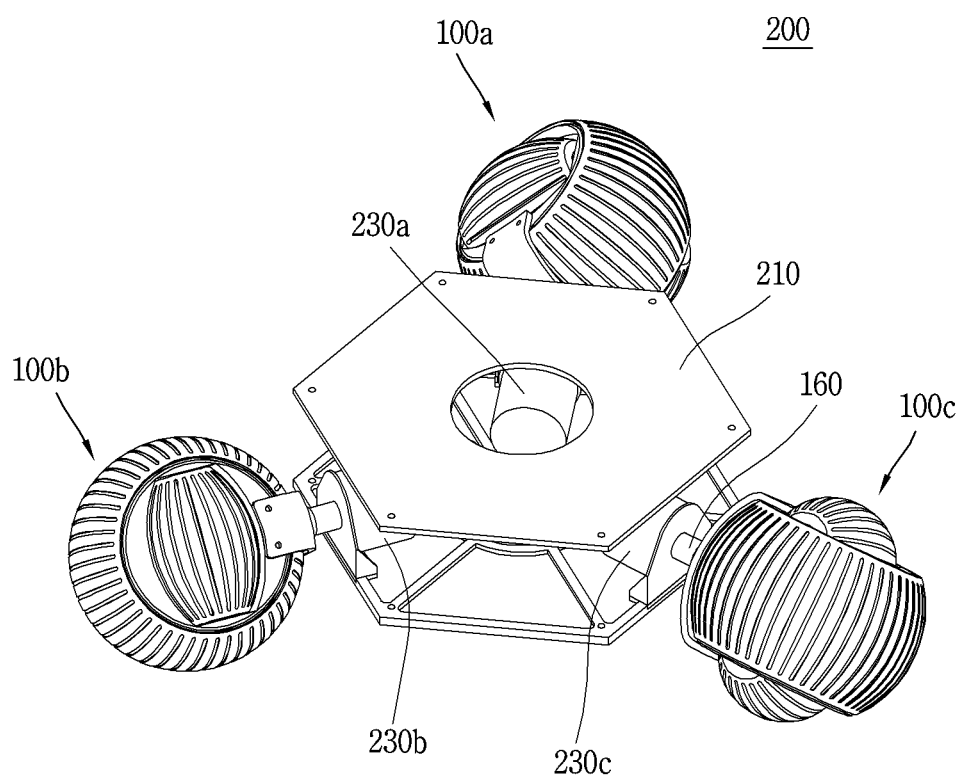
FIG. 11 is a perspective view illustrating a robot using a wheel in accordance with one embodiment of the present invention.
Figure 12:
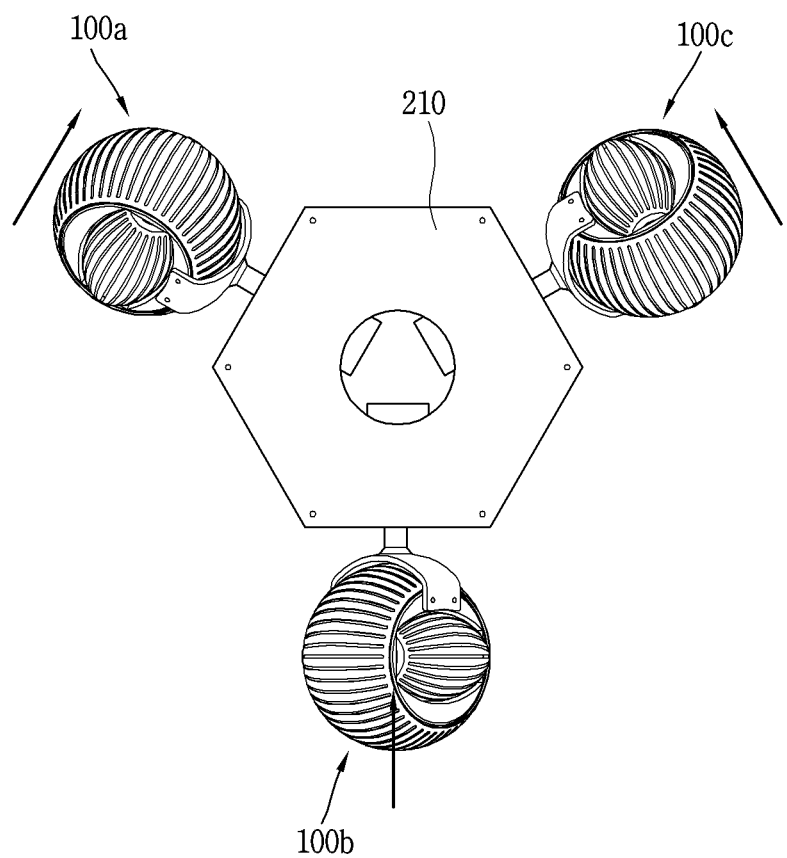
FIGS. 12 and 13 are views illustrating motions in accordance with one embodiment of the present invention.
Figure 13:
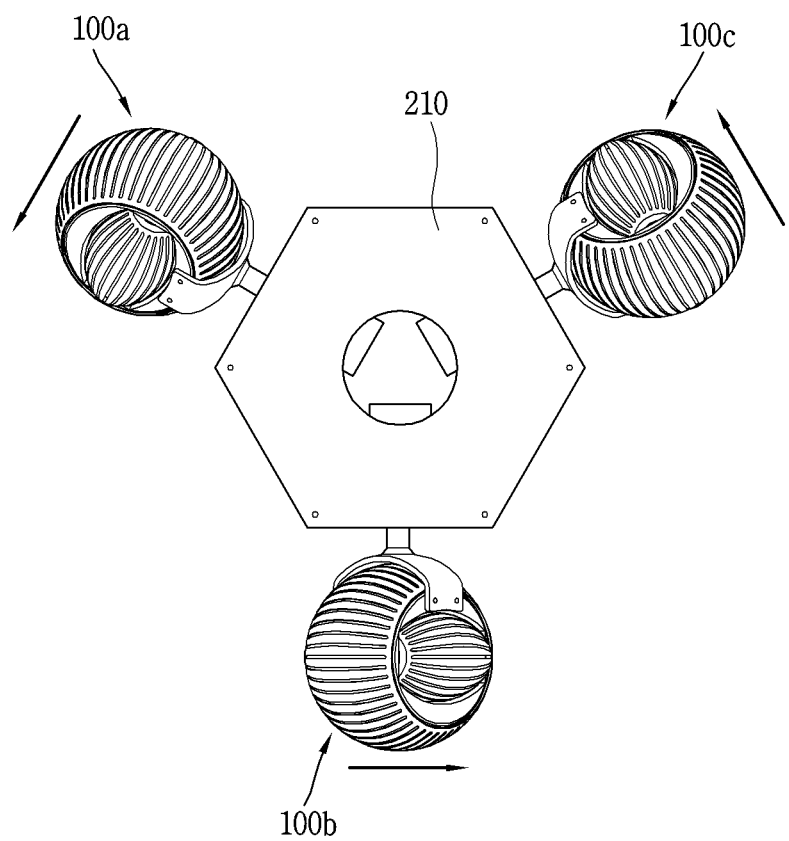

FIG. 11 is a perspective view of a robot 200 using wheels 100 according to one embodiment of the present invention, and FIGS. 12 and 13 are views illustrating motions according to the one embodiment of the present invention.

As illustrated in FIGS. 11 to 13, an omnidirectionally moving robot 200 according to one embodiment of the present invention includes at least three wheels 100, and the wheels 100 are provided with driving units 230a, 230b and 230c, respectively, for rotating the wheels 100 by transferring power to the wheels 100 so as to generate an active motion. At this time, each of the wheels 100 may move by way of an active motion and a passive motion. FIGS. 11 to 13 are schematic exemplary views of the omnidirectionally moving robot 200 using the omnidirectionally moving wheels 100 according to one embodiment of the present invention. In order to implement the omnidirectionally moving robot 200, additional components are needed. For example, description will be omitted for a power supply unit for supplying power to the driving units 230a, 230b, and 230c and a body (trunk, arm, leg, etc.) attached to the robot 200.

In one embodiment of the present invention, the number of the wheels 100 is three. However, the present invention is not limited to this, and the number of the wheels 100 may be four or more.

At this time, at least one of the wheels 100 may move according to an active motion, and the rest may move according to a passive motion. Conversely, at least one of the wheels 100 may move according to the passive motion, and the rest may move according to the active motion. In addition, when at least two wheels 100 move according to the active motion, one wheel 100 may simultaneously generate both of the active motion and the passive motion. That is, when the first and second wheels 100a and 100b move according to the active motion, even a case where the first wheel 100a moves according to the passive motion due to the active motion of the second wheel 100b may occur.

FIG. 11 illustrates that the first to third wheels 100a, 100b and 100c are coupled to first to third driving units 230a, 230b and 230c provided between an upper plate 210 and a lower plate 220, and the first to third driving units 230a, 230b and 230c are coupled to the upper plate 210 and the lower plate 220, respectively.

In one embodiment of the present invention, the first to third wheels 100a, 100b and 100c are connected to a support member and supported by the support member. The support member includes the upper plate 210 and the lower plate 220 fixed to the driving units 230a, 230b and 230c at top and bottom of the driving units 230a, 230b and 230c. The omnidirectionally moving robot 200 may also be implemented without a suspension which can absorb an impact during movement.

FIG. 12 exemplarily illustrates the moving robot 200 that moves forward by using the first to third wheels 100a, 100b, and 100c according to one embodiment of the present invention, which illustrates that the first and third wheels 100a and 100c moves according to an active motion, and the second wheel 100b moves according to a passive motion that the second wheel 100b is passively pulled by the active motion of the first and third wheels 100a and 100c. At this time, a direction in which the robot 200 is to be moved is an arrow direction shown on the second wheel 100b along the moving direction of the second wheel 100b. The arrow directions indicated on the first and third wheels 100a and 100c is translational directions by the rotation of the first and third wheels 100a and 100c. The arrows in FIGS. 12 and 13 indicate the moving directions of the first to third wheels 100a, 100b and 100c.

Since the first wheel 100a tries to move to the right and the third wheel 100 tries to move to the left in FIG. 12, forces applied to each other is offset and only a resultant force of the first wheel 100a and the third wheel 100c applied in the direction that the moving robot 200 is to move is left.

In this way, the first and third wheels 100a and 100c are turned toward the direction to be moved. For example, in FIG. 12, when the first wheel 100a rotates clockwise and the third wheel 100c rotates counterclockwise, the first wheel 100a and the third wheel 100c move by a resultant force of the first wheel 100 and the third wheel 100c, and the second wheel 100b is moved by the resultant force in the applied direction of the resultant force according to the passive motion. As a result, the moving direction of the second wheel 100b, which is moved by the passive motion, becomes the moving direction of the moving robot 200. This case exemplarily illustrates that rotational forces of the first and third wheels 100a and 100c are the same as each other.

If the rotational forces of the first and third wheels 100a and 100c are different from each other, the moving robot 200 is tilted (biased) to one side. In this case, the robot 200 is moved or rotated with being biased to a side having a larger rotational force, and the second wheel 100b is moved by the passive motion along a direction of the resultant force applied to the first and third wheels 100a and 100c.

FIG. 13 exemplarily illustrates a moving robot 200 that rotates using the first to third wheels 100a, 100b, and 100c. In order for the moving robot 200 to rotate in place, the rotating directions and rotating speeds of the first to third wheels 100a, 100b, and 100c must be the same as one another. It may be understood as a case that the first to third wheels 100a, 100b and 100c have the same rotational force. That is, as illustrated in FIG. 13, when the first to third wheels 100a, 100b, and 100c rotate counterclockwise, the mobile robot 200 rotates counterclockwise accordingly. On the contrary, when the first to third wheels 100a, 100b and 100c rotate in the clockwise direction, the moving robot 200 rotates in place in the clockwise direction. However, when the wheels 100 adjacent to each other rotate in directions opposite to each other, the moving direction of the moving robot 200 is decided by the rotating direction of the remaining one wheel. For example, when the rotating direction of the first wheel 100a is switched to clockwise direction (to the right) opposite to the direction illustrated in FIG. 13, the resultant force applied to the first and third wheels 100a and 100c corresponds to only the force applied upward, similar to that illustrated in FIG. 12. In this case, the moving direction of the moving robot 200 is decided by a resultant force of the force applied upward (the resultant force applied to the first and third wheels 100a and 100c) and the force applied to the second wheel 100b.

As such, in order to rotate the moving robot 200 in place, the first to third wheels 100a, 100b, and 100c should have the same turning radius. Also, since the frequency of occurrence of impacts caused due to the inversion of the rotating direction of the outer wheel 130 even by less rotation increases, which results from the increase in the number of the wheels 100, it is important to reduce vibration during the rotation of the first to third wheels 100a, 100b and 100c.

The moving robot 200 according to one embodiment of the present invention can control the active motion of each of the first to third wheels 100a, 100b and 100c, and also control a translational motion as forward, backward, rightward and leftward movements (see A1, A2, P1, and P2 in FIG. 1) and the rotational motion that is made in place. In this case, the translational motion may be referred to as a second degree of freedom (DOF) motion, and the rotational motion may be referred to as a first DOF motion.

FIGS. 11 to 13 merely illustrate one example of the moving robot 200 using the omnidirectionally moving wheel 100. Accordingly, any configuration that uses the omnidirectionally moving wheel 100 according to one embodiment of the present invention will belong to the claims of the present invention.

The above detailed description should not be limitedly construed in all aspects and should be considered as illustrative. The scope of the present invention should be determined by rational interpretation of the appended claims, and all changes within the scope of equivalents of the present invention are included in the scope of the present invention.

INDUSTRIAL APPLICABILITY

The embodiment of the present invention can be applied to an omnidirectionally moving wheel, which is applied to a robot.

The invention claimed is:

1. An omnidirectionally moving wheel, the wheel comprising:
    a cylindrical body having a first open end and a second open end;
    inner wheels each having at least a part thereof accommodated in the cylindrical body, and fixed to each of the first and second open ends of the cylindrical body such that a first inner wheel rotates about a first rotating axis and a second inner wheel rotates about a second rotating axis parallel to the first rotating axis; and
    an outer wheel provided on an outside of the cylindrical body and rotating centering on a third rotating axis intersecting with the first and second rotating axes,
    wherein outermost points of the inner wheels and the outer wheel are formed at the same distance from a center of the cylindrical body, and
    wherein the omnidirectionally moving wheel further comprises first and second frames provided between the first and second inner wheels, formed at the outside of the cylindrical body, and coupled to each other into a shape corresponding to a shape of the outer wheel.

2. The wheel of claim 1, wherein first and second recess portions are formed on upper and lower portions of an outer circumferential surface of the body in an inwardly recessed manner, and the first and second frames are mounted in the first and second recess portions, respectively.

3. The wheel of claim 2, wherein each of the first and second frames has a shape that a part of a hollow hemisphere is cut.

4. The wheel of claim 2, wherein each of the first and second recess portions is provided with first and second through holes formed at positions facing each other, and
    wherein the first and second inner wheels are fixed to the body by first and second pins inserted through the first and second through holes, respectively.

5. The wheel of claim 4, wherein first and second bottom portions each having a shape of a flat surface are formed on upper and lower ends of a circumferential surface of the body in an inwardly protruding manner, and
    wherein the wheel further comprises a power transmission unit coupled to the first and second bottom portions to transmit power applied to the inner wheels and the outer wheel.

6. The wheel of claim 5, wherein the power transmission unit comprises:
    first and second coupling portions each having a shape of a flat surface and coupled to the respective first and second bottom portions;
    a connecting portion connecting the first and second coupling portions to each other; and
    a driving shaft fixed to the connecting portion to transmit power.

7. The wheel of claim 6, wherein the first and second inner wheels are formed in an elliptical shape.

8. The wheel of claim 7, wherein the power transmission unit is formed in a shape like an alphabet "C".

9. The wheel of claim 6, wherein an active motion is realized by a rotation of the drive shaft, and
    wherein the number of discontinuous points by the active motion is four.

10. The wheel of claim 1, wherein the first and second rotating axes are orthogonal to the third rotating axis.

11. The wheel of claim 1, wherein an angle α formed by lines extending from a center point of the body to the exposed both ends of the first inner wheel or the second inner wheel is in the range of 60 to 90°.

12. The wheel of claim 1, wherein the outer wheel has a shape that a spherical shape is cut from a top and a bottom with a plane perpendicular to the third rotating axis.

13. The wheel of claim 1, wherein grooves are formed on a surface of the first frame, and the first frame is coupled to the second frame by coupling members.

14. The wheel of claim 1, wherein a plurality of grooves are formed on a surface of each inner wheel in a direction parallel to the first rotating axis, and a plurality of grooves are formed on a surface of the outer wheel in a direction parallel to the third rotating axis.

15. The wheel of claim 1, wherein a maximum diameter of each of the inner wheels is the same as a radius of the outer wheel.

16. A moving robot, comprising:
- a plurality of wheels movable in an omnidirectional manner;
- driving units configured to rotate the wheels by transmitting power to the wheels so as to generate an active motion; and
- a support member connected to the driving units to support the driving units,
- wherein the plurality of wheels comprises at least three wheels,
- wherein each of the plurality of wheels comprises:
  - a cylindrical body having a first open end and a second open end;
  - inner wheels each having at least a part thereof accommodated in the cylindrical body, and fixed to each of the first and second open ends of the cylindrical body such that a first inner wheel rotates about a first rotating axis and a second inner wheel rotates about a second rotating axis parallel to the first rotating axis; and
  - an outer wheel provided on an outside of the cylindrical body and rotating centering on a third rotating axis intersecting with the first and second rotating axes,
  - wherein outermost points of the inner wheels and the outer wheel are formed at the same distance from a center of the cylindrical body, and
  - wherein the omnidirectionally moving wheel further comprises first and second frames provided between the first and second inner wheels, formed at the outside of the cylindrical body, and coupled to each other into a shape corresponding to a shape of the outer wheel.

17. The robot of claim 16, wherein each wheel moves omnidirectionally by a combination of an active motion by rotation of a driving shaft, and a passive motion by the active motion.

18. The robot of claim 17, wherein at least one of the wheels moves according to the active motion.

19. The robot of claim 16, wherein the support member comprises an upper plate and a lower plate fixed to the driving units on upper and lower portions of the driving units.

* * * * *